United States Patent
Lee

(10) Patent No.: US 10,257,234 B2
(45) Date of Patent: Apr. 9, 2019

(54) METHOD AND APPARATUS FOR CONTROLLING HANDOVER PROCEDURE IN WIRELESS COMMUNICATION SYSTEM

(71) Applicant: Samsung Electronics Co., Ltd., Gyeonggi-do (KR)

(72) Inventor: Song-Hak Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/565,260

(22) Filed: Dec. 9, 2014

(65) Prior Publication Data
US 2015/0163709 A1    Jun. 11, 2015

(30) Foreign Application Priority Data
Dec. 9, 2013 (KR) .................. 10-2013-0152377

(51) Int. Cl.
| | | |
|---|---|---|
| H04W 36/00 | (2009.01) | |
| H04W 24/10 | (2009.01) | |
| H04W 92/20 | (2009.01) | |
| H04L 29/06 | (2006.01) | |
| H04W 36/30 | (2009.01) | |

(52) U.S. Cl.
CPC ...... H04L 65/1006 (2013.01); H04L 65/1016 (2013.01); H04L 65/1069 (2013.01); H04L 65/80 (2013.01); H04W 36/00837 (2018.08); *H04W 36/30* (2013.01)

(58) Field of Classification Search
CPC .............. H04W 36/0083; H04W 76/02; H04L 65/1006
USPC ................... 370/331, 332; 455/561
See application file for complete search history.

(56) References Cited

U.S. PATENT DOCUMENTS

| | | | | |
|---|---|---|---|---|
| 2003/0050063 | A1* | 3/2003 | Faerber ................ | H04W 36/30 455/437 |
| 2003/0228870 | A1* | 12/2003 | Ishiguro ............... | H04W 36/12 455/439 |
| 2007/0015509 | A1* | 1/2007 | Xiang .................. | H04W 36/24 455/436 |
| 2007/0015510 | A1* | 1/2007 | Xiang .................. | H04W 48/14 455/436 |
| 2007/0168600 | A1* | 7/2007 | Anthony, Jr. ....... | H04L 65/1063 711/108 |
| 2007/0280264 | A1* | 12/2007 | Milton ............. | H04W 36/0022 370/395.31 |
| 2008/0031258 | A1* | 2/2008 | Acharya ................ | H04L 47/10 370/395.42 |
| 2009/0061904 | A1* | 3/2009 | Emrich ............... | H04W 72/005 455/456.6 |
| 2012/0172042 | A1* | 7/2012 | Drevon ............... | H04W 36/385 455/436 |
| 2013/0044613 | A1* | 2/2013 | Edara .................. | H04W 76/026 370/252 |
| 2013/0065595 | A1* | 3/2013 | Hu ..................... | H04W 36/0033 455/436 |

(Continued)

*Primary Examiner* — Asad M Nawaz
*Assistant Examiner* — Jason A Harley

(57) ABSTRACT

A method is provided for controlling a handover procedure in a wireless communication system. In a method for operating a base station, whether a session setup request for a voice call of a terminal occurs is determined. If a handover request from the terminal occurs within a time period after the session setup request occurs, triggering of a handover procedure is delayed.

20 Claims, 13 Drawing Sheets

(56) References Cited

U.S. PATENT DOCUMENTS

2013/0286819 A1* 10/2013 Kim .................. H04L 41/0654
370/225

* cited by examiner

METHOD AND APPARATUS FOR CONTROLLING HANDOVER PROCEDURE IN WIRELESS COMMUNICATION SYSTEM

PRIORITY

The present application is related to and claims the benefit under 35 U.S.C. § 119(a) of a Korean patent application filed in the Korean Intellectual Property Office on Dec. 9, 2013 and assigned Serial No. 10-2013-0152377, the entire disclosure of which is hereby incorporated by reference.

TECHNICAL FIELD

The present disclosure relates to a handover in a wireless communication system.

BACKGROUND

A wireless communication system includes base stations providing a wireless access in a cell of a predefined range. The base station may be denoted by a different name depending on a standard of a system. Since each base station provides a wireless access to a terminal positioned inside a cell, when the terminal moves from a cell of one base station to a cell of another base station, a handover may be performed in order to provide continuity of a service. Though the wireless communication system may provide service continuity via the handover, the following problem may occur depending on a point at which a serving base station changes by the handover.

Recently, as a call service using packet communication, Voice over Internet Protocol (VoIP) is in the limelight. Generally, Session Initiation Protocol (SIP) is used as a call control protocol of the VoIP. Since a base station does not get involved signaling related to the SIP, it does not know a VoIP call setup procedure is in process before a VoIP bearer is set. Therefore, while the VoIP call setup procedure is triggered from a terminal or a network and is in progress, when a condition for performing a handover is met, the base station proceeds with a handover procedure.

As described above, even when the VoIP call setup procedure is in process, a handover procedure may be performed. In this embodiment, the base station receives a message for the VoIP bearer setup while the handover procedure is in progress. However, since the handover procedure is in progress already, the base station cannot process the VoIP bearer setup. That is, the VoIP bearer setup fails. Accordingly, the terminal accesses a target base station, and then should perform the VoIP bearer setup procedure again. That is, a delay in the VoIP bearer setup may occur due to the handover procedure.

SUMMARY

To address the above-discussed deficiencies, it is a primary object to provide an apparatus and a method for preventing a delay of Voice over Internet Protocol (VoIP) setup in a wireless communication system.

Another aspect of the present disclosure is to provide an apparatus and a method for raising a success ratio of a bearer setup for a VoIP call in a wireless communication system.

Still another aspect of the present disclosure is to provide an apparatus and a method for controlling triggering of a handover procedure in a wireless communication system.

Yet another aspect of the present disclosure is to provide an apparatus and a method for recognizing a VoIP call setup procedure is triggered in a wireless communication system.

Still yet another aspect of the present disclosure is to provide an apparatus and a method for delaying triggering of a handover procedure when a VoIP call setup procedure is triggered in a wireless communication system.

In accordance with an aspect of the present disclosure, a method is provided for operating a base station in a wireless communication system. The method includes determining whether a session setup request for a voice call of a terminal occurs, and if a handover request from the terminal occurs within a time period after the session setup request occurs, controlling to delay triggering of a handover procedure.

In accordance with another aspect of the present disclosure, a method is provided for operating a terminal in a wireless communication system. The method includes performing a signaling requesting a session setup for a voice call, and transmitting a message informing a session setup request occurs to a base station.

In accordance with still another aspect of the present disclosure, a base station apparatus is provided in a wireless communication system. The base station apparatus includes a controller for determining whether a session setup request for a voice call of a terminal occurs, and if a handover request from the terminal occurs within a time period after the session setup request occurs, controlling to delay triggering of a handover procedure.

In accordance with yet another aspect of the present disclosure, a terminal apparatus is provided in a wireless communication system. The terminal apparatus includes a controller for performing a signaling requesting a session setup for a voice call, and a transmitter for transmitting a message informing a session setup request occurs to a base station.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, a technology for controlling triggering of a handover procedure in a wireless communication system is described.

A terminology for identifying messages, a terminology for identifying protocol layers, a terminology for indicating network entities, a terminology for indicating a connection state, and the like, used for the following description are intended for convenience in description. Therefore, the present disclosure is not limited to terminologies described below, and other terminologies denoting an object having the same technical meaning may be used. For example, a terminal may be denoted by a 'Mobile Station (MS)', and 'User Equipment (UE)', and a base station may be denoted by 'evolved-Node B (eNB)'.

Figure 1:
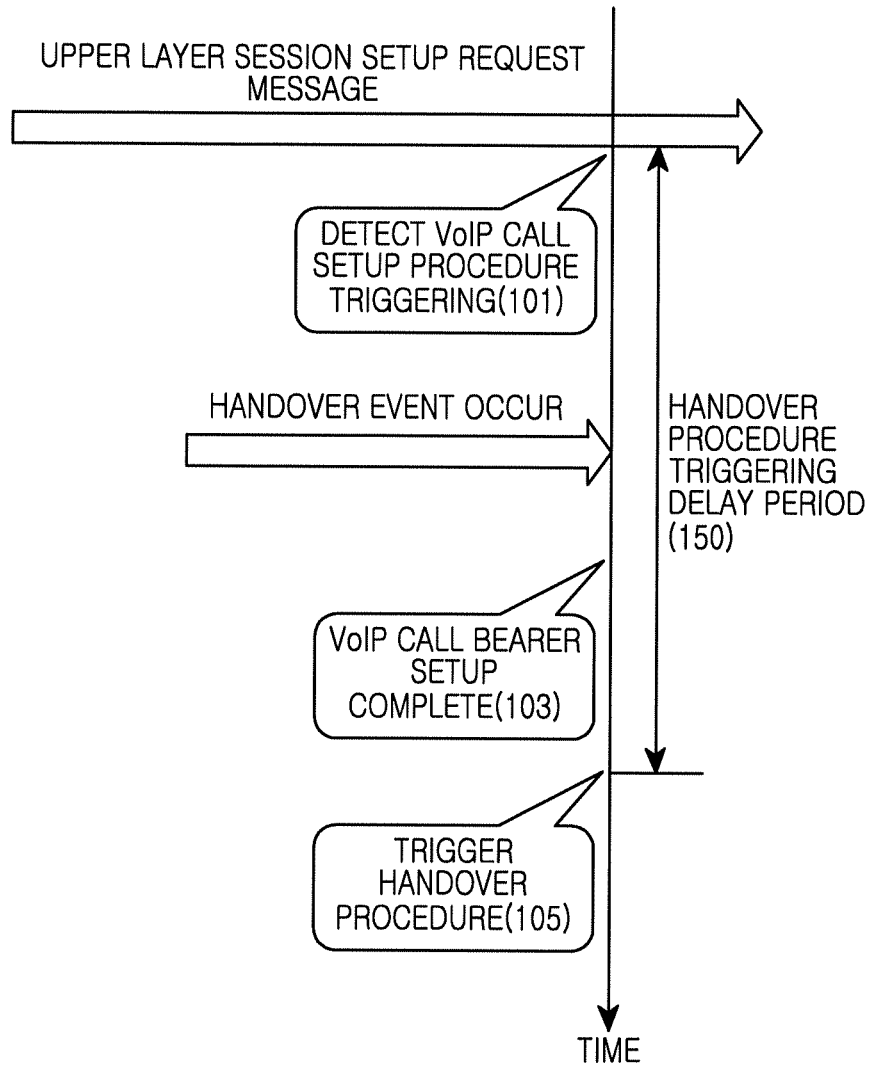
FIG. 1 illustrates a conceptual view showing a procedure for controlling triggering of a handover procedure in a wireless communication system according to an embodiment of the present disclosure.

FIG. 1 illustrates a conceptual view showing a procedure for controlling triggering of a handover procedure in a wireless communication system according to an embodiment of the present disclosure.

Referring to FIG. 1, when a session setup request message is transmitted, a Voice over Internet Protocol (VoIP) call setup procedure is triggered. A session setup request message for the VoIP call setup is a message of an upper layer transferred to an IP Multimedia Subsystem (IMS) domain, and is not processed by a base station. The IMS domain may include a Call State Control Function (CSCF) responsible for registration that uses a Session Initiation Protocol (SIP) protocol and a multimedia call processing function, and a Home Subscriber Server (HSS) where mobility management and authentication of an Internet Protocol (IP) multimedia user has been integrated into a Home Location Register (HLR) function of a legacy mobile network.

According to an embodiment of the present disclosure, the base station may recognize a session setup request message for a VoIP call by examining a message of an upper layer not processed by the base station. For example, when an SIP is used, the base station detects an SIP INVITE message. For this purpose, the base station may use a string matching technique in a Packet Data Convergence Protocol (PDCP)/General Packet Radio Service Tunneling Protocol (GTP) level. Since the SIP uses a message configured in the form of a Hypertext Transfer Protocol (HTTP)-based character string, a method name or content of the SIP message is fixed at a position excluding Internet Protocol (IP)/User Datagram Protocol (UDP) or Transmission Control Protocol (TCP) header information. Therefore, the base station may detect the SIP INVITE message by searching 'INVITE' which is a method name inside the SIP INVITE message via simple string matching.

In block 101, the base station detects a VoIP call setup procedure is triggered using the above method. Accordingly, the base station sets a certain time period to a handover procedure trigger delay period 150. In other words, when detecting the SIP INVITE transmitted from a terminal or transmitted to the terminal, the base station does not trigger a handover procedure for the time period even if a handover event occurs. For example, the base station that has detected the SIP INVITE message transitions to a voice call indication state by informing that the VoIP call setup procedure is internally performed using a call processing function.

In the voice call indication state, even when a handover request message is received, a call processing function of the base station delays the handover procedure until a VoIP voice bearer is set. After that, in block 103, the base station completes VoIP voice bearer setup, and in block 105, the base station triggers the handover procedure requested previously.

Figure 2:
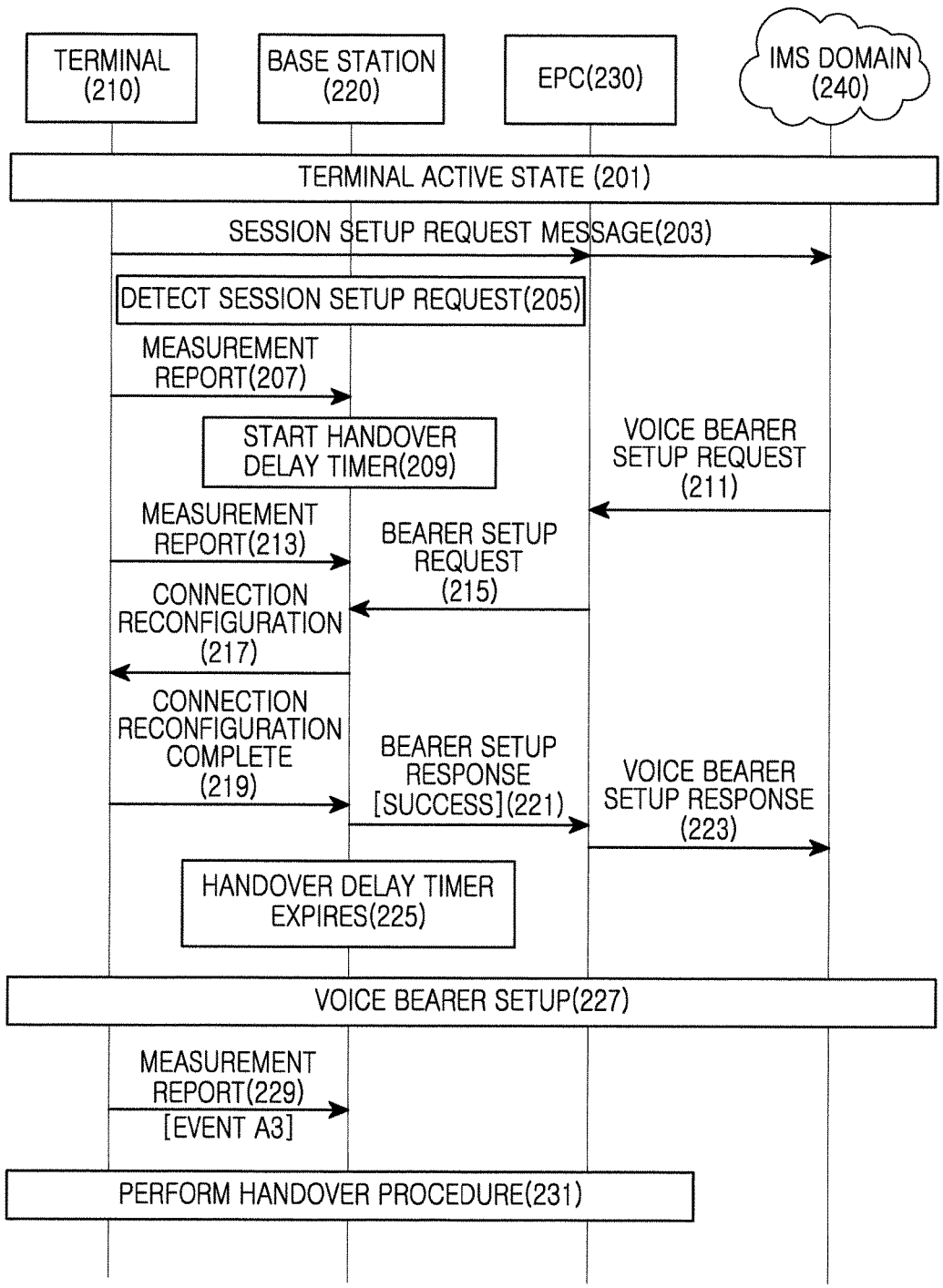
FIG. 2 illustrates a view showing signal exchange for controlling triggering of a handover procedure in a wireless communication system according to an embodiment of the present disclosure.

FIG. 2 illustrates a view showing signal exchange for controlling triggering of a handover procedure in a wireless communication system according to an embodiment of the present disclosure.

Referring to FIG. 2, in block 201, a terminal 201 is in an active state. The active state is a state where the terminal may transmit/receive a signal to/from a base station 220, and may be denoted by a 'Radio Resource Control (RRC)- connected state'. Also, the terminal 210 is in a state registered in an IMS domain 240. Also, in connection with a VoIP call, both an event A3 and an event A5 for controlling a handover procedure are set. In the description below, the event A3 is an event for requesting a handover because channel quality with a neighbor base station is superior, and the event A5 denotes an event for requesting a handover because a channel quality with a serving base station is inferior.

In block 203, the terminal 210 transmits a session setup request message to a network. The session setup request message may be transmitted when a user of the terminal 210 originates a VoIP call via a VoIP application. For example, the session setup request message may be a SIP INVITE message. The session setup request message may be transferred to an Evolved Packet Core (EPC) 230 via a default bearer held by the terminal 210, and then transmitted to the IMS domain 240. That is, the session setup request message is physically transferred via the base station 220, but the base station 220 does not process the session setup request message.

In block 205, the base station 220 detects a session setup request generated by the terminal 210. That is, the base station 220 determines an IP packet including the SIP INVITE message at a user plane level. For example, the base station 220 may identify the SIP INVITE message via string matching. To transfer an IP packet received from the terminal 210 in a PDCP layer to a Serving Gateway (S-GW) inside the EPC, the base station 220 configures a GTP packet including the IP packet. At this point, the base station 220 examines whether the SIP INVITE message is included inside the IP packet.

In block 207, the terminal 210 transmits measurement report (MR) to the base station 220. The measurement report is information informing channel quality regarding at least one base station including the base station 220 measured by the terminal 210. The MR may be transmitted periodically. Since the MR is independent of the session setup request, block 207 may be omitted.

In block 209, the base station 220 starts a handover delay timer for controlling a handover. A specific value of the handover delay timer may change depending on various embodiments of the disclosure. The handover delay timer may be denoted by 'T_HO_DELAY_FOR_VOICE'. The handover delay timer may be defined as a system parameter inside the base station 220 according to Table 1 below.

TABLE 1

| a system parameter | value [ms] |
| --- | --- |
| T_HO_DELAY_FOR_VOICE | xx |

In block 211, the IMS domain 240 transmits a voice bearer setup request to the EPC 230. That is, the IMS domain 240 requests a wireless access network to set a bearer for the VoIP call. The EPC 230 may include a Mobility Management Entity (MME), an S-GW, a Packet-GateWay (P-GW), and the like.

In block 213, the terminal 210 transmits an MR to the base station 220. The MR is information informing channel quality regarding at least one base station including the base station 220 measured by the terminal 210. Also, the MR may inform occurrence of at least one of events defined inside the system. With an embodiment illustrated in FIG. 2, in block 213, the terminal transmits the MR informing occurrence of an event A3. However, since the handover delay timer is being driven currently, although the base station 220 is informed of occurrence of the event A3, the base station 220 does not trigger a handover procedure. In other words, the base station 220 does not trigger the handover procedure and waits for reception of a bearer setup request for the VoIP call until an expire point of the handover delay timer.

In block 215, the EPC 230 transmits a bearer setup request to the base station 220. The bearer setup request may be transferred via S1-Application Protocol (AP). At this point, the requested bearer has a Quality of Service Class Identifier (QCI), and the bearer may be an E-UTRAN Radio Access Bearer (E-RAB) where QCI is 1.

In block 217, the base station 220 transmits a connection reconfiguration message for bearer setup to the terminal 210. The connection reconfiguration message includes information regarding a bearer to be set. The connection reconfiguration message may be denoted by an RRC-connection reconfiguration message. That is, since the handover delay timer is being driven, the base station 220 may not perform the handover procedure and may perform the bearer setup request preferentially.

In block 219, the terminal 210 transmits a connection reconfiguration complete message to the base station 220. That is, the terminal 210 performs a process used by the terminal 210 for the bearer setup depending on information included in the connection reconfiguration message, and then transmits the connection reconfiguration complete message as a response to the connection reconfiguration message. The connection reconfiguration complete message may be denoted by an RRC-connection reconfiguration complete message.

In block 221, the base station 220 transmits a bearer setup response to the EPC 230. The bearer setup response may include a parameter informing bearer setup succeeds. The bearer setup response may be transferred via the S1-AP.

In block 223, the EPC 230 transmits a voice bearer setup response to the IMS domain 240. In other words, the EPC 230 transmits the voice bearer setup response as a response to the voice bearer setup request received in block 211. The voice bearer setup response may indicate bearer setup has been successfully completed.

In block 225, the base station 220 recognizes expiration of the handover delay timer. That is, block 225 is a point at which a time indicated by the handover delay timer has elapsed from block 209. Accordingly, the base station 220 may perform the handover procedure.

In block 227, establishment of a voice bearer for the VoIP call is completed. That is, as triggering of a handover procedure is delayed by the handover delay timer, establishment of a voice bearer for the VoIP call may be completed before the handover procedure is triggered.

In block 229, the terminal 210 transmits an MR to the base station 220. The terminal 210 has informed occurrence of the event A3 in block 213, but the handover procedure has not been triggered. Accordingly, the terminal 210 transmits the MR informing occurrence of the event A3 again.

In block 231, the terminal 210, the base station 220, and the EPC 230 perform the handover procedure. That is, the terminal 210 performs a procedure for accessing another base station, not the base station 220. Accordingly, a bearer for the VoIP call set in the terminal 210 may be moved to another base station.

Figure 3:
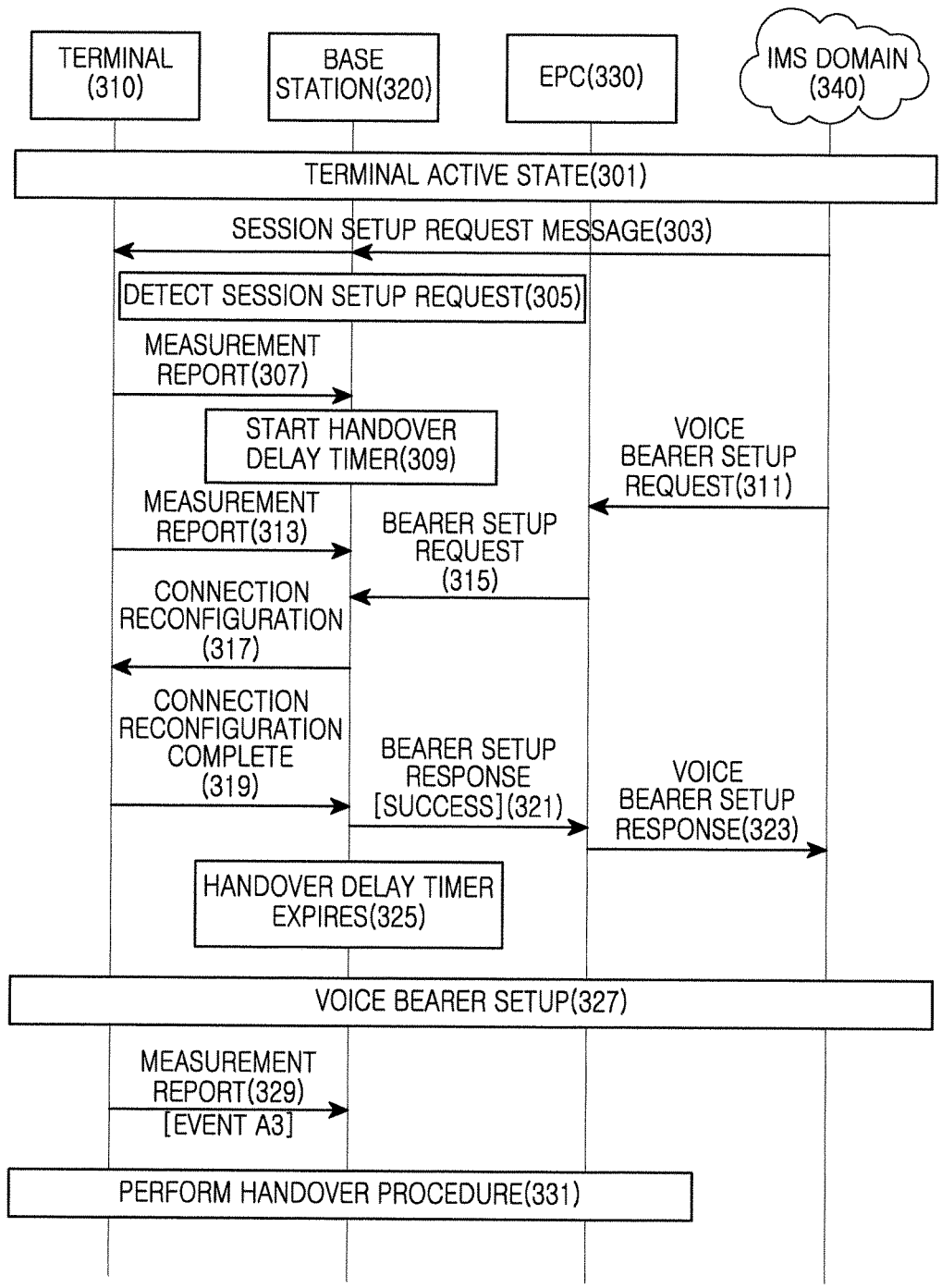
FIG. 3 illustrates a view showing signal exchange for controlling triggering of a handover procedure in a wireless communication system according to another embodiment of the present disclosure.

FIG. 3 illustrates a view showing signal exchange for controlling triggering of a handover procedure in a wireless communication system according to another embodiment of the present disclosure.

Referring to FIG. 3, in block 301, the terminal 310 is in an active state. The active state is a state where the terminal may transmit/receive a signal to/from a base station 320, and may be denoted by a 'Radio Resource Control (RRC)-connected state'. Also, the terminal 310 is in a state registered in an IMS domain 340. Also, in connection with a VoIP call, both an event A3 and an event A5 for controlling a handover procedure are set. In the description below, the event A3 is an event for requesting a handover because channel quality with a neighbor base station is superior, and the event A5 denotes an event for requesting a handover because a channel quality with a serving base station is inferior.

In block 303, the terminal 310 receives a session setup request message from a network. The session request message may be received when a user of a different terminal originates a VoIP call to a user of the terminal 310. For example, the session setup request message may be a SIP INVITE message. The session setup request message may be received from an EPC 330 via a default bearer. That is, the session setup request message is physically transferred via the base station 320, but the base station 320 does not process the session setup request message.

In block 305, the base station 320 detects a session setup request generated by the terminal 310. That is, the base station 320 determines an IP packet including the SIP INVITE message at a user plane level. For example, the base station 320 may identify the SIP INVITE message via string matching. To transfer an IP packet received from the terminal 310 in a PDCP layer to a Serving Gateway (S-GW) inside the EPC 330, the base station 320 configures a GTP packet including the IP packet. At this point, the base station 320 examines whether the SIP INVITE message is included inside the IP packet.

In block 307, the terminal 310 transmits an MR to the base station 320. The MR is information informing channel quality regarding at least one base station including the base station 320 measured by the terminal 310. The MR may be transmitted periodically. Since the MR is independent of the session setup request, block 307 may be omitted.

In block 309, the base station 320 starts a handover delay timer for controlling a handover. A specific value of the handover delay timer may change depending on various embodiments of the disclosure. The handover delay timer may be denoted by 'T_HO_DELAY_FOR_VOICE'. The handover delay timer may be defined as a system parameter inside the base station 320 according to Table 1 above.

In block 311, the IMS domain 340 transmits a voice bearer setup request to the EPC 330. That is, the IMS domain 340 requests a wireless access network to set a bearer for the VoIP call. The EPC 330 may include a Mobility Management Entity (MME), an S-GW, a Packet-GateWay (P-GW), and the like.

In block 313, the terminal 310 transmits an MR to the base station 320. The MR is information informing channel quality regarding at least one base station including the base station 320 measured by the terminal 310. Also, the MR may inform occurrence of at least one of events defined inside the system. With an embodiment illustrated in FIG. 3, in block 313, the terminal transmits the MR informing occurrence of an event A3. However, since the handover delay timer is being driven currently, although the base station 320 is informed of occurrence of the event A3, the base station 320 does not trigger a handover procedure. In other words, the base station 320 does not trigger the handover procedure and waits for reception of a bearer setup request for the VoIP call until an expire point of the handover delay timer.

In block 315, the EPC 330 transmits a bearer setup request to the base station 320. The bearer setup request may be transferred via S1-AP. At this point, the requested bearer has a QCI, and the bearer may be an E-RAB where QCI is 1.

In block 317, the base station 320 transmits a connection reconfiguration message for bearer setup to the terminal 310. The connection reconfiguration message includes information regarding a bearer to be set. The connection reconfiguration message may be denoted by an RRC-connection reconfiguration message. That is, since the handover delay timer is being driven, the base station 320 may not perform the handover procedure and may perform the bearer setup request preferentially.

In block 319, the terminal 310 transmits a connection reconfiguration complete message to the base station 320. That is, the terminal 310 performs a process used by the terminal 310 for the bearer setup depending on information included in the connection reconfiguration message, and then transmits the connection reconfiguration complete message as a response to the connection reconfiguration message. The connection reconfiguration complete message may be denoted by an RRC-connection reconfiguration complete message.

In block 321, the base station 320 transmits a bearer setup response to the EPC 330. The bearer setup response may include a parameter informing bearer setup succeeds. The bearer setup response may be transferred via the S1-AP.

In block 323, the EPC 330 transmits a voice bearer setup response to the IMS domain 340. In other words, the EPC 330 transmits the voice bearer setup response as a response to the voice bearer setup request received in block 311. The voice bearer setup response may indicate bearer setup has been successfully completed.

In block 325, the base station 320 recognizes expiration of the handover delay timer. That is, block 325 is a point at which a time indicated by the handover delay timer has elapsed from block 309. Accordingly, the base station 320 may perform the handover procedure.

In block 327, establishment of a voice bearer for the VoIP call is completed. That is, as triggering of a handover procedure is delayed by the handover delay timer, establishment of a voice bearer for the VoIP call may be completed before the handover procedure is triggered.

In block 329, the terminal 310 transmits an MR to the base station 320. The terminal 310 has informed occurrence of the event A3 in block 313, but the handover procedure has not been triggered. Accordingly, the terminal 310 transmits the MR informing occurrence of the event A3 again.

In block 331, the terminal 310, the base station 320, and the EPC 330 perform the handover procedure. That is, the terminal 310 performs a procedure for accessing another base station, not the base station 320. Accordingly, a bearer for the VoIP call set in the terminal 310 may be moved to another base station.

In embodiments illustrated in FIGS. 2 and 3, before expiration of the handover delay timer, the bearer setup request is received in the base stations 220 and 320. However, according to another embodiment of the present disclosure, before expiration of the handover delay timer, the bearer setup request may not be received in the base stations 220 and 320. In this embodiment, prior to the bearer setup procedure, the handover procedure may be triggered.

Also, in embodiments illustrated in FIGS. 2 and 3, before expiration of the handover delay timer, an event A3 related to a handover occurs. That is, a handover is requested. However, even when the handover is not requested, the bearer setup request may be received. In this embodiment, the base station may end the handover delay timer and perform a bearer setup procedure for the VoIP call.

In the embodiments illustrated in FIGS. 2 and 3, the handover is performed by occurrence of an event A3. The handover due to the event A3 is a handover method by a difference in a channel quality between a source cell and a target cell. That is, when the event A3 occurs, even when a condition under which a terminal will access the source cell is met, when an offset condition for the difference is met, a handover may be performed.

In an embodiment, a handover due to an event A5 is a handover method performed when a signal quality of the source cell is poor by less than a predefined level and a signal quality of the target cell is good by a predefined level or more. Therefore, even when a handover is delayed for the purpose of providing bearer setup, signal intensity may be so weak that a service is more difficult. As a result, when the event A5 occurs, when triggering of the handover procedure is delayed, a Radio Link Failure (RLF) may rather occur. Therefore, when the event A5 occurs, even while the handover delay timer is being driven, it is desirable to trigger a handover procedure. When the event A5 occurs, signal exchange according to an embodiment of the present disclosure is exemplarily illustrated in FIG. 4.

Figure 4:
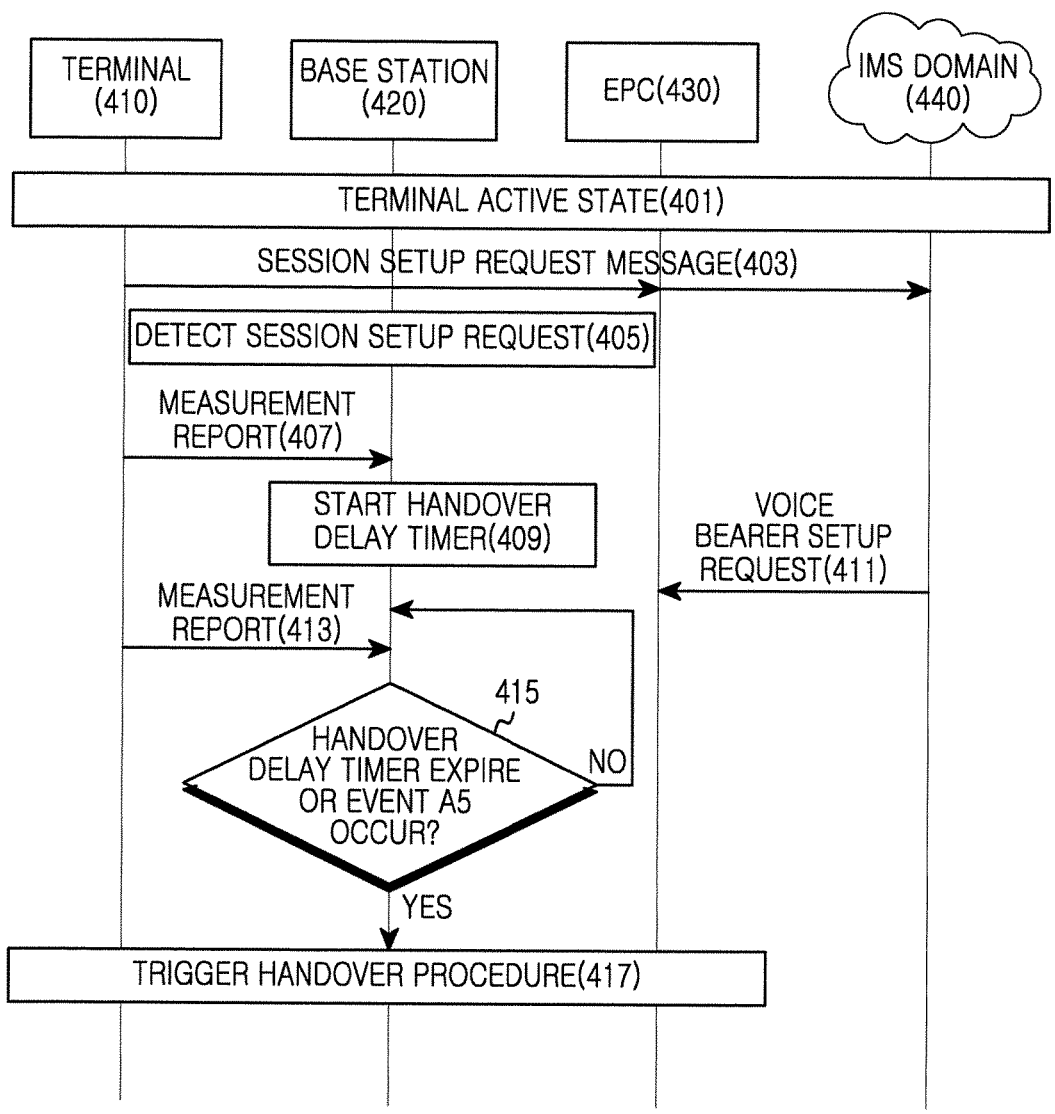
FIG. 4 illustrates a view showing signal exchange for controlling triggering of a handover procedure in a wireless communication system according to still another embodiment of the present disclosure.

FIG. 4 illustrates a view showing signal exchange for controlling triggering of a handover procedure in a wireless communication system according to still another embodiment of the present disclosure. FIG. 4 illustrates an embodiment of stopping a handover delay timer and triggering a handover procedure depending on occurrence of an event A5.

Referring to FIG. 4, in block 401, the terminal 410 is in an active state. The active state is a state where the terminal may transmit/receive a signal to/from a base station 420, and may be denoted by a 'Radio Resource Control (RRC)-connected state'. Also, the terminal 410 is in a state registered in an IMS domain 440. Also, in connection with a VoIP call, both an event A3 and an event A5 for controlling a handover procedure are set. In the description below, the event A3 is an event for requesting a handover because channel quality with a neighbor base station is superior, and the event A5 denotes an event for requesting a handover because a channel quality with a serving base station is inferior.

In block 403, the terminal 410 transmits a session setup request message to a network. The session request message may be transmitted when a user of the terminal 410 originates a VoIP call via a VoIP application. For example, the session setup request message may be a SIP INVITE message. The session setup request message is transferred to the EPC 430 via a default bearer held by the terminal 410, and then transmitted to the IMS domain 440. That is, the session setup request message is physically transferred via the base station 420, but the base station 420 does not process the session setup request message.

In block 405, the base station 420 detects a session setup request generated by the terminal 410. That is, the base station 420 determines an IP packet including the SIP INVITE message at a user plane level. For example, the base station 420 may identify the SIP INVITE message via string matching. To transfer an IP packet received from the terminal 410 in a PDCP layer to an S-GW inside the EPC 430, the base station 420 configures a GTP packet including the IP packet. At this point, the base station 420 examines whether the SIP INVITE message is included inside the IP packet.

In block 407, the terminal 410 transmits an MR to the base station 420. The MR is information informing channel quality regarding at least one base station including the base station 420 measured by the terminal 410. The MR may be transmitted periodically. Since the MR is independent of the session setup request, block 407 may be omitted.

In block 409, the base station 420 starts a handover delay timer for controlling a handover. A specific value of the handover delay timer may change depending on various embodiments of the disclosure. The handover delay timer may be denoted by 'T_HO_DELAY_FOR_VOICE'. The handover delay timer may be defined as a system parameter inside the base station 420 according to Table 1 above.

In block 411, the IMS domain 440 transmits a voice bearer setup request to the EPC 430. That is, the IMS domain 440 requests a wireless access network to set a bearer for the VoIP call. The EPC 430 may include an MME, an S-GW, a P-GW, and the like.

In block 413, the terminal 410 transmits an MR to the base station 420. The MR is information informing channel quality regarding at least one base station including the base station 420 measured by the terminal 410. Also, the MR may inform occurrence of at least one of events defined inside the system. With an embodiment illustrated in FIG. 4, in block 411, the terminal 410 transmits the MR informing occurrence of an event A5.

In block 415, the base station 420 determines whether the handover delay timer has expired or the event A5 has occurred. When the handover delay timer has not expired and also the event A5 has not occurred, the base station 420 does not trigger the handover procedure in spite of the MR. With an embodiment illustrated in FIG. 4, the event A5 has occurred.

In block 417, the terminal 410, the base station 420, and the EPC 430 perform the handover procedure. The event A5 is an event requesting a handover because a channel quality between the terminal 410 and the base station 420 is inferior. That is, the event A4 means an obstacle exists in performing communication between the terminal 410 and the base station 420. In other words, when the event A5 has occurred, even when trigger of the handover procedure is delayed, successful completion of a bearer setup procedure is may not be provided. Therefore, when the event A5 occurs, the base station 420 triggers the handover procedure even when the handover delay timer is being driven.

Figure 5:
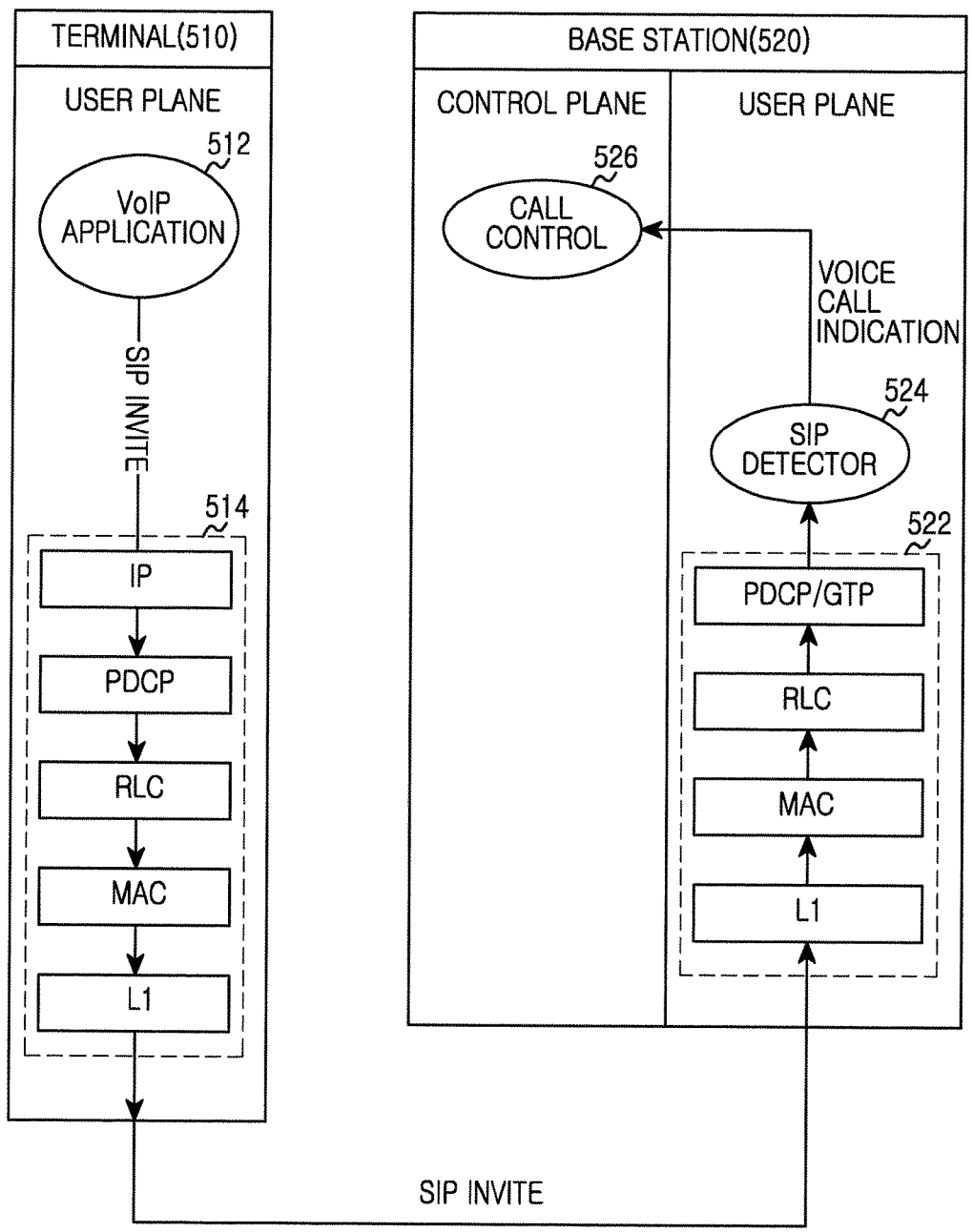
FIG. 5 illustrates a view showing a functional structure of a terminal and a base station in a wireless communication system according to an embodiment of the present disclosure.

FIG. 5 illustrates a view showing a functional structure of a terminal and a base station in a wireless communication system according to an embodiment of the present disclosure. FIG. 5 exemplarily illustrates a structure of a terminal and a base station for operating according to FIG. 2, 3, or 4.

Referring to FIG. 5, a user plane of the terminal 510 includes a VoIP application 512 and a protocol stack 514. The VoIP application 512 recognizes a user's call originating instruction, and generates a message for session setup. For example, the message for the session setup may include a SIP INVITE message. The protocol stack 514 may include an IP, a PDCP, a Radio Link Control (RLC), a Media Access Control (MAC), a Layer-1 (L1), and the like. The protocol stack 514 processes the session setup request message such that it may match a protocol of the system and may be transferred via a radio link.

A user plane of the base station 520 includes a protocol stack 522 and a SIP detector 524. A protocol stack 522 may include an L1, an MAC, an RLC, a PDCP/GTP, and the like. The protocol stack 522 processes the session setup request message received via a radio link such that it may match a protocol of the system. The SIP detector 524 detects the session setup request message, and informs a VoIP call is in progress using a call control function 526 belonging to a control plane. For example, the SIP detector 524 transmits a voice call indication using the call control function 526.

In an embodiment, the SIP detector 524 defines a string pattern (ex: 'INVITE') for detecting the SIP INVITE message. The SIP detector 524 examines whether an 'INVITE' value is included based on the pattern in the rest of portions excluding an IP/UDP or IP/TCP header included in the SIP INVITE message in processing an IP packet provided from the protocol stack 522. When the 'INVITE' value is included, the SIP detector 524 informs the VoIP call is in progress using the call control function 526. Accordingly, the call control function 526 starts the handover delay timer for controlling a handover.

In the above embodiment, the base station may detect a session setup request message of an upper layer via string matching that uses a string pattern. That is, according to the above embodiment, the base station identifies a progress of a procedure for a VoIP call setup at a user plane level, and controls a voice bearer and a handover procedure for a VoIP call via an upper call control function.

Unlike this, according to another embodiment of the present disclosure, the terminal may perform explicit signaling informing the base station that a procedure for the VoIP call setup is in progress. For this purpose, a message for informing a progress of a procedure for the VoIP call setup may be defined in a layer processed by the base station. For example, a new message of the RRC layer may be defined. The message may be denoted by a 'voice indication message', and the message may perform a function similar to the voice call indication of FIG. 5 in a control plane of the base station.

In this embodiment, the terminal transmits a session setup request message via a VoIP application, and simultaneously, transmits the voice indication message in the RRC layer. Accordingly, a call control function of the base station receives the voice indication message via the RRC layer, and starts the handover delay timer. The voice indication message may be configured according to Table 2.

INVITE message. Also, the VoIP application 612 informs the RRC layer 614 that a procedure for the VoIP call setup is triggered. Accordingly, the RRC layer 614 generates a voice call indication informing that the procedure for the VoIP call setup is triggered via the RRC layer. The voice call indication may be denoted by a voice indication message.

A control plane of the base station 620 includes an RRC layer 622 and a call control function 624. The RRC layer 622 receives the voice call indication transmitted by the terminal 610. Also, the RRC layer 622 provides the voice call indication using the call control function 624, that is, informs a procedure for VoIP call setup is performed in the terminal. Accordingly, the call control function 624 starts a handover delay timer for controlling a handover.

Figure 7:
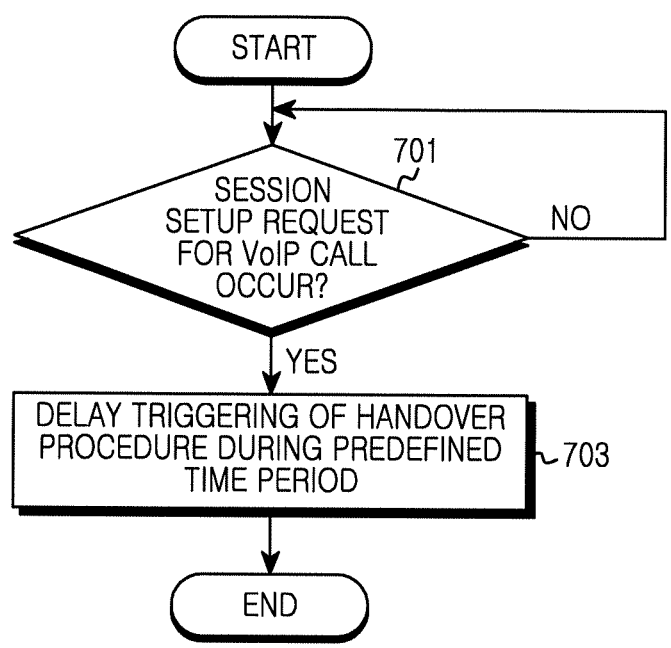
FIG. 7 illustrates a process of a procedure for operating a base station in a wireless communication system according to an embodiment of the present disclosure.

FIG. 7 illustrates a process of a procedure for operating a base station in a wireless communication system according to an embodiment of the present disclosure.

Referring to FIG. 7, in block 701, the base station determines whether a session setup request for a VoIP call occurs. The session setup request occurs when a terminal accessing the base station originates a VoIP call or receives a call. Since the session setup request occurs in a protocol of an upper layer that is not processed by the base station, a base station according to the conventional art cannot recognize the session setup request. However, according to an embodiment of the present disclosure, the base station may recognize the session setup request via string pattern check or a separate indication message.

When the session setup request occurs, the base station proceeds to block 703 to delay triggering of a handover procedure for a predefined time period. In other words, the base station prohibits triggering of a handover procedure of a terminal related to the session setup request, that is, a terminal that has received or transmitted the session setup request for the predefined time period. For this purpose, the base station may start a timer defined for the handover procedure delay, and delay triggering of the handover procedure. In other words, even when a request of a handover

TABLE 2

```
-- ASN1START
VoiceIndication-rXX ::= SEQUENCE {
    criticalExtensions          CHOICE {
        c1                          CHOICE {
            voiceIndication-rXX         VoiceIndication-rXX-IEs,
            spare3 NULL, spare2 NULL, spare1 NULL
        },
        criticalExtensionsFuture    SEQUENCE { }
    }
}
VoiceIndication-rXX-IEs ::= SEQUENCE {
    type                        ENUMERATED {mobileOriginating, mobileTerminating},
    emergencyIndication         ENUMERATED {true}       OPTIONAL,
    nonCriticalExtension        SEQUENCE { }            OPTIONAL
}
-- ASN1STOP
```

Figure 6:
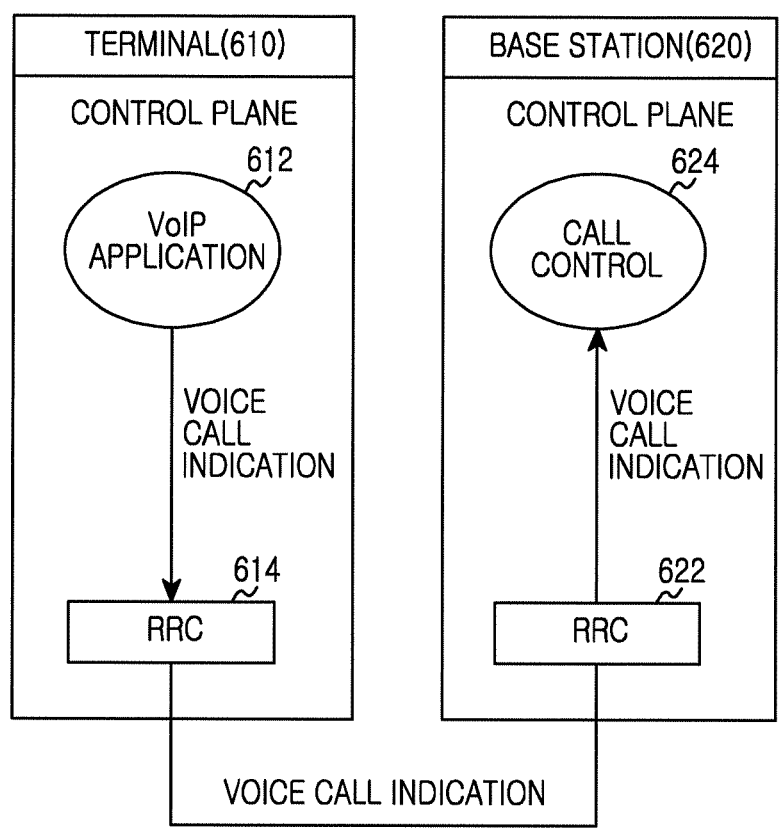
FIG. 6 illustrates a view showing a functional structure of a terminal and a base station in a wireless communication system according to another embodiment of the present disclosure.

FIG. 6 illustrates a view showing a functional structure of a terminal and a base station in a wireless communication system according to another embodiment of the present disclosure. FIG. 6 exemplarily illustrates a structure of a terminal and a base station for using a voice indication message of the RRC layer.

Referring to FIG. 6, a user plane of the terminal 610 includes a VoIP application 612 and an RRC layer 614. The VoIP application 612 recognizes a user's call originating instruction and generates a message for session setup. For example, the message for session setup may include an SIP or occurrence of a handover event is informed by a terminal related to the session setup request, when the time period does not elapse, the base station does not trigger a handover procedure for the terminal. However, even when the time period does not elapse, when session setup is completed, the base station may trigger a handover procedure for the terminal.

Figure 8:
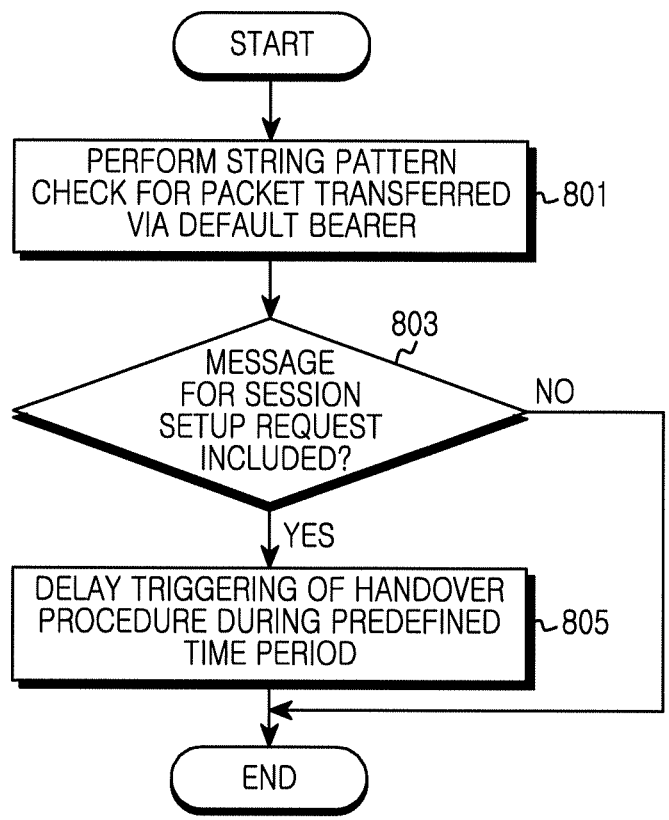
FIG. 8 illustrates a process of a procedure for operating a base station in a wireless communication system according to another embodiment of the present disclosure.

FIG. 8 illustrates a process of a procedure for operating a base station in a wireless communication system according to another embodiment of the present disclosure.

Referring to FIG. 8, the base station performs string pattern check for a packet transferred via a default bearer in block 801. The string pattern check is for determining whether a character string of a specific pattern is included in the packet, and the base station may identify an upper layer message of a specific purpose via the string pattern check. For example, the base station may perform the string pattern check in order to identify an SIP INVITE message which is an upper layer message for a session setup request.

Subsequently, the base station proceeds to block 803 to determine whether a message for session setup is included as a result of the string pattern check. Since the session setup request occurs in a protocol of an upper layer that is not processed by the base station, a base station according to the conventional art cannot recognize the session setup request. However, according to an embodiment of the present disclosure, the base station may recognize the session setup request via the string pattern check. For example, when a character string of 'INVITE' is included in the packet, the base station may determine that a message for the session setup is included.

When the message for the session setup request is included, the base station proceeds to block 805 to delay triggering of a handover procedure for a predefined time period. For this purpose, the base station may start a timer defined for the handover procedure delay, and delay triggering of the handover procedure until the timer expires. For example, the base station may identify a message for the session setup request in a user plane, and control triggering of the handover procedure in a control plane.

Figure 9:
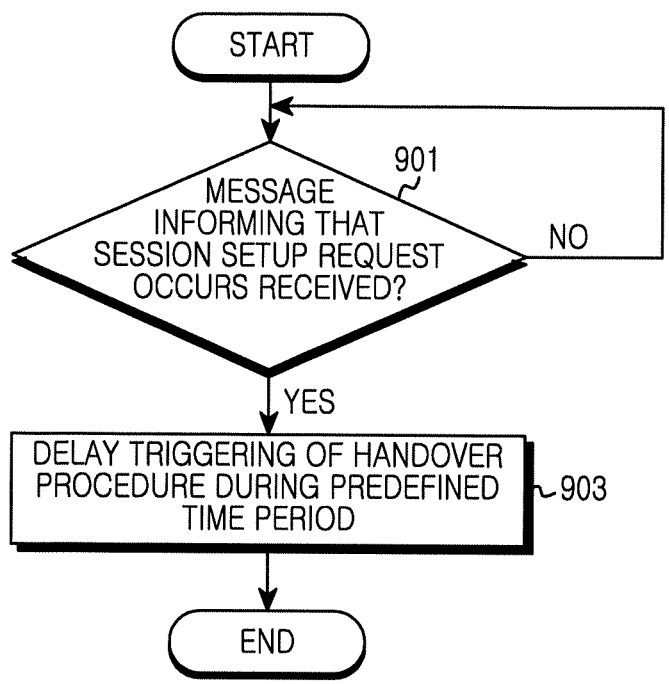
FIG. 9 illustrates a process of a procedure for operating a base station in a wireless communication system according to still another embodiment of the present disclosure.

FIG. 9 illustrates a process of a procedure for operating a base station in a wireless communication system according to still another embodiment of the present disclosure.

Referring to FIG. 9, the base station determines whether a message informing a session setup request occurs is received in block 901. Since the session setup request occurs in a protocol of an upper layer that is not processed by the base station, the base station is informed that the session setup request occurs via signaling of a lower layer. The lower layer means a layer processed by the base station. For example, the lower layer may include an RRC layer. That is, the base station may receive a message of an RRC layer informing that a session setup request occurs.

When the message informing that a session setup request occurs is received, the base station proceeds to block 903 to delay triggering of a handover procedure for a predefined time period. For this purpose, the base station may start a timer defined for the handover procedure delay, and delay triggering of the handover procedure until the timer expires. For example, the base station may identify the message in a control plane, and control triggering of the handover procedure. For example, the message may be configured according to Table 2 above.

Figure 10:
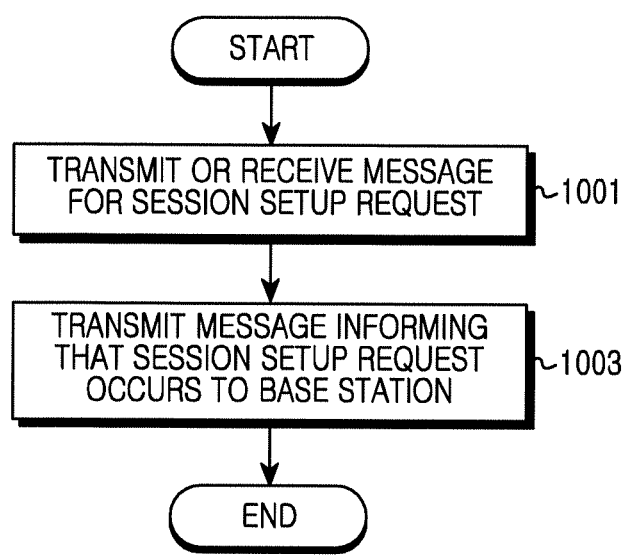
FIG. 10 illustrates a process of a procedure for operating a terminal in a wireless communication system according to an embodiment of the present disclosure.

FIG. 10 illustrates a process of a procedure for operating a terminal in a wireless communication system according to an embodiment of the present disclosure.

Referring to FIG. 10, the terminal transmits or receives a message for a session setup request in block 1001. The message for the session setup request is transmitted when the terminal originates a VoIP call, and received when the terminal receives a VoIP call. The message for the session setup request is processed by a protocol of an upper layer that is not processed by the base station. For example, the message for the session setup request may include an SIP INVITE message.

Subsequently, the terminal proceeds to block 1003 to transmit a message informing that the session setup request occurs to the base station. Since the session setup request occurs in a protocol of an upper layer that is not processed by the base station, the terminal informs that the session setup request occurs via signaling of a lower layer. The lower layer means a layer processed by the base station. For example, the lower layer may include an RRC layer. For example, the message may be configured according to Table 2.

Figure 11:
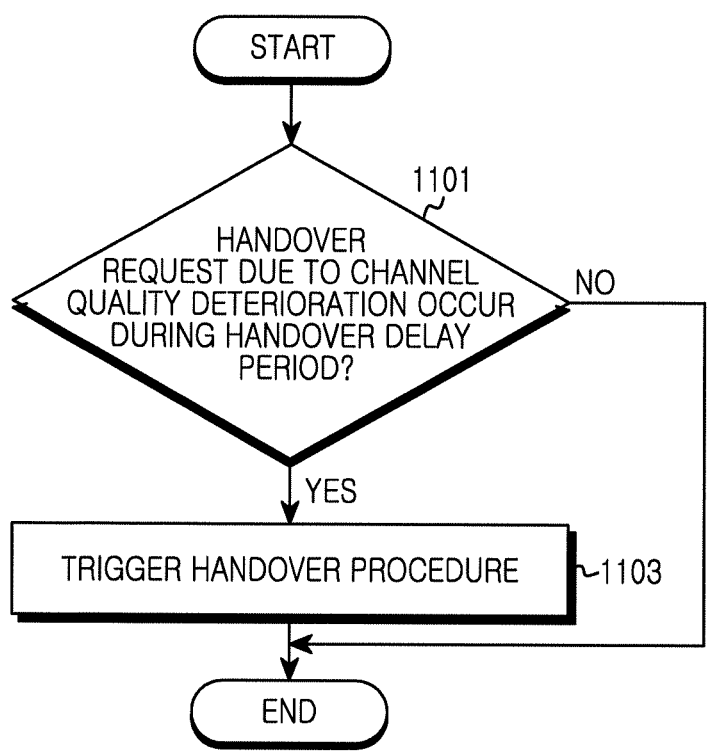
FIG. 11 illustrates a process of a procedure for operating a base station in a wireless communication system according to a still yet another embodiment of the present disclosure.

FIG. 11 illustrates a process of a procedure for operating a base station in a wireless communication system according to a still yet another embodiment of the present disclosure.

Referring to FIG. 11, the base station determines whether a handover request by channel quality deterioration occurs during a time period for a handover delay in block 1101. In other words, the base station determines whether a handover due to deterioration of channel quality between the base station and the terminal is desired. For example, a circumstance where a handover due to deterioration of the channel quality is desired may be denoted by an event A5. In this embodiment, the base station determines whether occurrence of the event A5 is informed by the terminal.

When a handover request by channel quality deterioration occurs, the base station proceeds to block 1103 to trigger a handover procedure. That is, even though the time period has not elapsed, the base station performs a handover procedure for the terminal, in other words, a procedure for changing a serving base station of the terminal. When the channel quality deteriorates and a handover is delayed, an RLF may rather occur. Therefore, when a handover due to deterioration of the channel quality is requested, the base station may trigger a handover procedure even during a time period for the handover delay.

Figure 12:
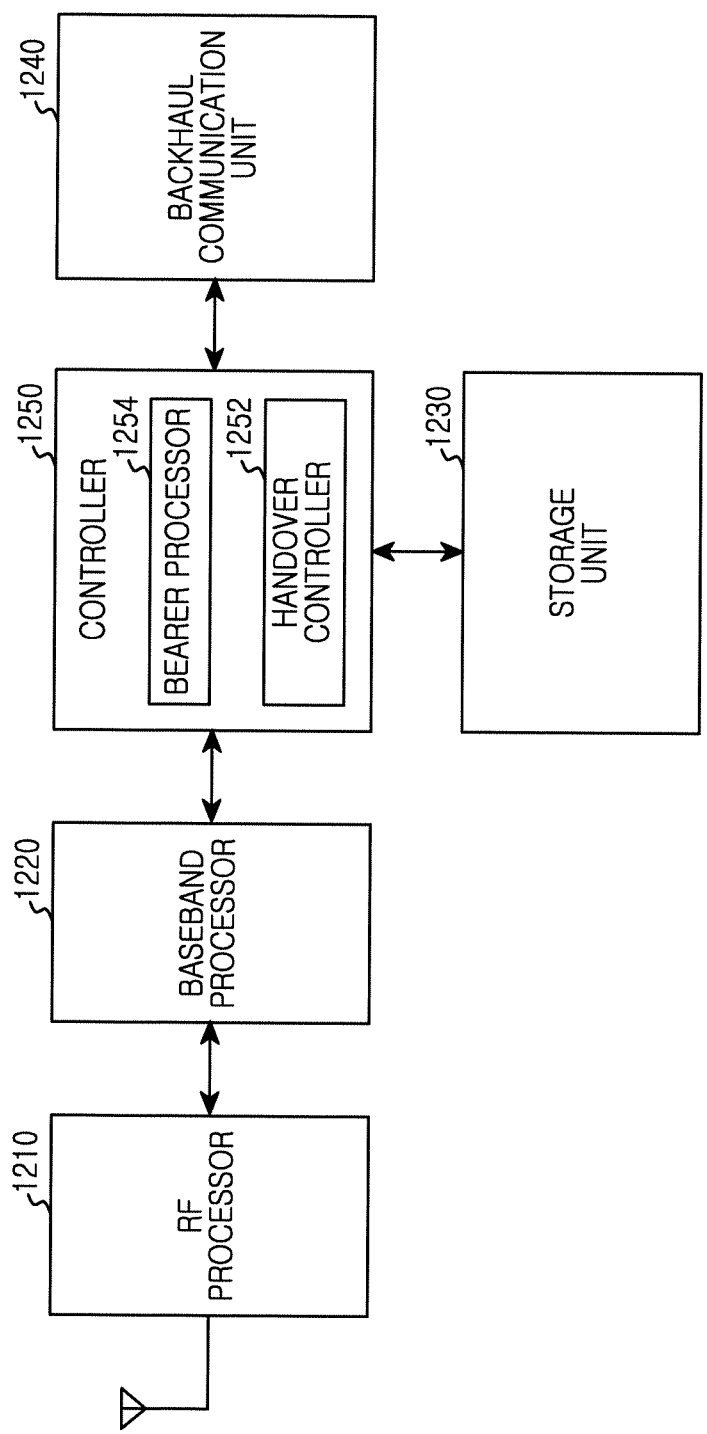
FIG. 12 illustrates a block diagram showing a base station in a wireless communication system according to an embodiment of the present disclosure.

FIG. 12 illustrates a block diagram showing a base station in a wireless communication system according to an embodiment of the present disclosure.

As illustrated in FIG. 12, the base station includes a Radio Frequency (RF) processor 1210, a baseband processor 1220, a backhaul communication unit 1240, a storage unit 1230, and a controller 1250.

The RF processor 1210 performs a function for transmitting/receiving a signal via a radio channel such as band conversion, amplification, and the like of a signal. That is, the RF processor 1210 up-converts a baseband signal provided from a baseband processor 1220 to an RF signal, and then transmits the same via an antenna, and down-converts an RF signal received via the antenna to a baseband signal. For example, the RF processor 1210 may include a transmission filter, a reception filter, an amplifier, a mixer, an oscillator, a Digital to Analog Converter (DAC), an Analog to Digital Converter (ADC), and the like. In FIG. 1, though one antenna has been illustrated, the base station may have a plurality of antennas. Also, the RF processor 1210 may include a plurality of RF chains. Furthermore, the RF processor 1210 may perform beamforming. For the beamforming, the RF processor 1210 may adjust a phase and a magnitude of each of signals transmitted/received via a plurality of antennas or antenna elements.

The baseband processor 1220 performs a conversion function between a baseband signal and a bit string according to a physical layer standard of the system. For example, during data transmission, the baseband processor 1220 generates complex symbols by encoding and modulating a transmission bit string. Also, during data reception, the baseband processor 1220 recovers a reception bit string by demodulating and decoding a baseband signal provided from the RF processor 1210. For example, with an Orthogonal Frequency Division Multiplexing (OFDM) scheme, during data transmission, the baseband processor 1220 generates complex symbols by encoding and modulating a transmission bit string, and maps the complex symbols to subcarriers and then performs Inverse Fast Fourier Transform (IFFT) and Cyclic Prefix (CP) insertion to configure OFDM symbols. Also, during data reception, the baseband processor 1220 divides a baseband signal provided from the RF processor 1210 on an OFDM symbol basis, recovers signals mapped to subcarriers by performing Fast Fourier Transform (FFT), and then recovers a reception bit string by performing demodulation and decoding. The baseband processor 1220 and the RF processor 1210 transmit and receive a signal as described above. Accordingly, the baseband processor 1220 and the RF processor 1210 may be denoted by a transmitter, a receiver, a transceiver, a communication unit, or a wireless communication unit.

The backhaul communication unit 1240 provides an interface for performing communication with a different node inside a network. That is, the backhaul communication unit 1240 converts a bit string transmitted from the base station to a different node, for example, a different base station, an S-GW, a P-GW, an MME, and the like, to a physical signal, and converts a physical signal received from the different node to a bit string.

The storage unit 1230 stores a basic program for an operation of the base station, an application, and data of setting information, and the like. Also, the storage unit 1230 provides stored data depending on a request of the controller 1250.

The controller 1250 controls overall operations of the base station. For example, the controller 1250 transmits/receives a signal via the baseband processor 1220 and the RF processor 1210 or the backhaul communication unit 1230. Also, the controller 1250 records/reads data to/from the storage unit 1230. For this purpose, the controller 1250 may include at least one processor. According to an embodiment of the present disclosure, the controller 1250 includes a handover controller 1252 for controlling triggering of a handover procedure and a bearer processor 1254 for controlling a bearer setup procedure. For example, the controller 1250 may control to perform procedures illustrated in FIGS. 7, 8, 9, and 11. An operation of the controller 1250 according to an embodiment of the present disclosure is described below.

According to an embodiment of the present disclosure, the controller 1250 determines whether a session setup request for a VoIP call of a terminal occurs. For example, the controller 1250 may determine whether a session setup request for the VoIP call occurs by performing a string pattern check for a packet transferred via a default bearer of the terminal, or receiving a lower layer message informing that the session setup request occurs. When the session setup request for the VoIP call occurs, the controller 1250 delays triggering of a handover procedure during a predefined time period. For this purpose, the controller 1250 may start a timer defined for the handover procedure delay, and delay triggering of the handover procedure until the timer expires. However, even when the time period has not elapsed, when session setup expires, the controller 1250 may trigger a handover procedure for the terminal.

However, when a handover request by channel quality deterioration between the base station and the terminal occurs, even when the time period has not elapsed, the controller 1250 triggers a handover procedure of the terminal. When the channel quality has deteriorated, when a handover is delayed, an RLF may rather occur. Therefore, when a handover due to deterioration of the channel quality is requested, the controller 1250 may trigger a handover procedure even during the time period for the handover delay.

Figure 13:
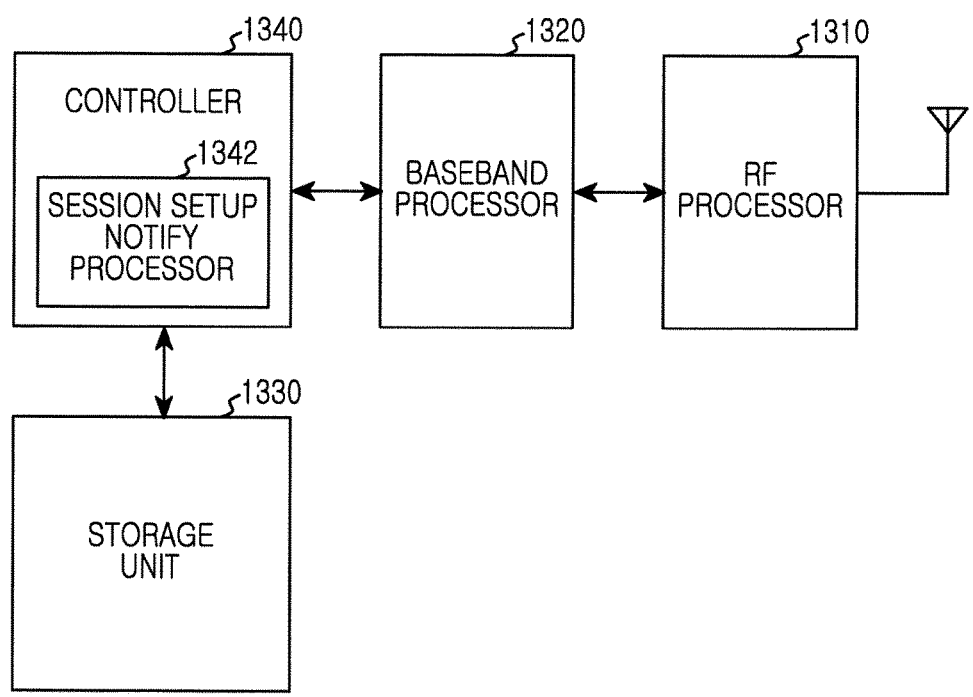
FIG. 13 illustrates a block diagram showing a terminal in a wireless communication system according to an embodiment of the present disclosure.

FIG. 13 illustrates a block diagram showing a terminal in a wireless communication system according to an embodiment of the present disclosure.

Referring to FIG. 13, the terminal includes an RF processor 1310, a baseband processor 1320, a storage unit 1330, and a controller 1340.

The RF processor 1310 performs a function for transmitting/receiving a signal via a radio channel such as band conversion, amplification, and the like of a signal. That is, the RF processor 1310 up-converts a baseband signal provided from a baseband processor 1320 to an RF signal, and then transmits the same via an antenna, and down-converts an RF signal received via the antenna to a baseband signal. For example, the RF processor 1310 may include a transmission filter, a reception filter, an amplifier, a mixer, an oscillator, a Digital to Analog Converter (DAC), an Analog to Digital Converter (ADC), and the like. In FIG. 1, though one antenna has been illustrated, the terminal may have a plurality of antennas. Also, the RF processor 1310 may include a plurality of RF chains. Furthermore, the RF processor 1310 may perform beamforming. For the beamforming, the RF processor 1310 may adjust a phase and a magnitude of each of signals transmitted/received via a plurality of antennas or antenna elements.

The baseband processor 1320 performs a conversion function between a baseband signal and a bit string according to a physical layer standard of the system. For example, during data transmission, the baseband processor 1320 generates complex symbols by encoding and modulating a transmission bit string. Also, during data reception, the baseband processor 1320 recovers a reception bit string by demodulating and decoding a baseband signal provided from the RF processor 1310. For example, in case of an OFDM scheme, during data transmission, the baseband processor 1320 generates complex symbols by encoding and modulating a transmission bit string, and maps the complex symbols to subcarriers and then performs Inverse Fast Fourier Transform (IFFT) and Cyclic Prefix (CP) insertion to configure OFDM symbols. Also, during data reception, the baseband processor 1320 divides a baseband signal provided from the RF processor 1310 on an OFDM symbol basis, recovers signals mapped to subcarriers by performing Fast Fourier Transform (FFT), and then recovers a reception bit string by performing demodulation and decoding. The baseband processor 1320 and the RF processor 1310 transmit and receive a signal as described above. Accordingly, the baseband processor 1320 and the RF processor 1310 may be denoted by a transmitter, a receiver, a transceiver, or a communication unit.

The storage unit 1330 stores a basic program for an operation of the terminal, an application, and data of setting information, and the like. Also, the storage unit 1330 provides stored data depending on a request of the controller 1340.

The controller 1340 controls overall operations of the terminal. For example, the controller 1340 transmits/receives a signal via the baseband processor 1320 and the RF processor 1310. Also, the controller 1340 records/reads data to/from the storage unit 1330. For this purpose, the controller 1340 may include at least one processor. According to an embodiment, the controller 1340 includes a session setup notify processor 1342 for processing signaling for informing that a session setup procedure is performed to a base station. For example, the controller 1340 may control the terminal to perform the procedure illustrated in FIG. 10. An operation of the controller 1340 according to an embodiment of the present disclosure is described below.

The controller 1340 transmits or receives a message for a session setup request via the baseband processor 1320 and the RF processor 1310. The message for the session setup request is transmitted when the terminal originates a VoIP call, and received when the terminal receives a VoIP call. Subsequently, the controller 1340 generates a message informing that the session setup request occurs, and transmits the same to the base station via the baseband processor 1320 and the RF processor 1310. Since the session setup request occurs in a protocol of an upper layer that is not processed by the base station, the controller 1340 notifies the session setup request occurs via signaling of a lower layer. The lower layer means a layer processed by the base station. For example, the lower layer may include an RRC layer. For example, the message may be configured according to Table 2 above.

A wireless communication system controls triggering of a handover procedure, such that a success rate for a bearer setup request improves during VoIP call setup, and a time delay problem may be solved.

In specific embodiments of the present disclosure, an element included in the disclosure has been expressed in the singular or in the plural depending on a suggested specific embodiment. However, expression of the singular or the plural has been selected such that it is suitable for the suggested circumstance for convenience in description, and the present disclosure is not limited to an element of the singular or plural form. Even an element expressed in the plural may be configured in the singular, or even an element expressed in the singular may be configured in the plural.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A method for operating a base station serving a terminal in a wireless communication system, the method comprising: detecting, by the base station, a first message for requesting a setup of a voice call transmitted from a terminal; setting a timer of a predetermined duration for setup of the voice call in response to detecting of the first message; if the base station receives, from the terminal, a second message for requesting a handover of the terminal from the base station to another base station during the predetermined duration, delaying the handover during the predetermined duration until the setup of the voice call is completed within the predetermined duration; and performing the handover after the predetermined duration based on a quality of a channel between the terminal and the base station; and if the base station receives, from the terminal, a third message for requesting the handover during the predetermined duration, performing the handover within the predetermined duration, wherein the third message is received from the terminal based on the quality of the channel between the terminal and the base station is less than a first threshold, and a quality of the channel between the terminal and the another base station is greater than a second threshold.

2. The method of claim 1, wherein the detecting of the first message comprises: performing, by the base station, a string pattern check for a packet transmitted from the terminal or a packet transmitted to the terminal; and determining, by the base station, whether a string representing the first message is included based on the string pattern check, wherein the second message is received from the terminal based on difference in quality of the channel between the base station and the another base station.

3. The method of claim 1, wherein the detecting of the first message comprises: receiving, by the base station, the first message for requesting the setup of the voice call.

4. The method of claim 1, further comprising: starting, by the base station, the timer in response to the detecting of the first message; and delaying, by the base station, triggering of the handover until the timer expires.

5. The method of claim 1, further comprising: receiving the third message for requesting another handover indicating channel quality deterioration between the base station and the terminal during the predetermined duration; and triggering, by the base station, the another handover.

6. The method of claim 1, wherein the voice call comprises a voice over internal protocol (VoIP) call.

7. The method of claim 1, during the predetermined duration, further comprising: transmitting, to the terminal, a message for a connection reconfiguration associated with setting a voice bearer; and receiving, from the terminal, a message indicating a completion of the connection reconfiguration.

8. A method for operating a terminal served by a base station in a wireless communication system, the method comprising: transmitting, by the terminal, a first message for requesting a setup of a voice call, wherein the first message is used to set a timer of a predetermined duration for setup of the voice call by the base station; transmitting, by the terminal, to the base station, a second message for requesting a handover of the terminal from the base station to another base station during the predetermined duration, wherein during the predetermined duration, the handover is delayed until the setup of the voice call is completed within the predetermined duration; performing the handover after the predetermined duration based on a quality of a channel between the base station and the terminal, if the quality of the channel between the terminal and the base station is less than a first threshold, and a quality of the channel between the terminal and the another base station is greater than a second threshold; transmitting, to the base station, a third message for requesting the handover during the predetermined duration; and performing the handover within the predetermined duration.

9. The method of claim 8, wherein the voice call comprises a voice over internal protocol (VoIP) call, and wherein the second message is transmitted to the base station based on difference in quality of the channel between the base station and the another base station.

10. The method of claim 8, during the predetermined duration, further comprising: receiving, from the base station, a message for a connection reconfiguration associated with setting a voice bearer; and transmitting, to the base station, a message indicating a completion of the connection reconfiguration.

11. An apparatus for a base station serving a terminal in a wireless communication system, the apparatus comprising: at least one processor configured to detect a first message for requesting a setup of a voice call transmitted from a terminal; and at least one transceiver configured to: set a timer of a predetermined duration for setup of the voice call in response to detection of the first message, if the base station receives, from the terminal, a second message for requesting a handover of the terminal from the base station to another base station during the predetermined duration, and delay the handover during the predetermined duration until the setup of the voice call is completed within the predetermined duration, wherein the at least one processor is further configured to: perform the handover after the predetermined duration based on a quality of a channel between the terminal and the base station, and if the base station receives, from the terminal, a third message for requesting the handover during the predetermined duration, perform the handover within the predetermined duration, wherein the third message is received from the terminal based on the quality of the channel between the terminal and the base station is less than a first threshold, and a quality of the channel between the terminal and the another base station is greater than a second threshold.

12. The apparatus of claim 11, wherein the at least one processor is further configured to: perform a string pattern check for a packet transmitted from the terminal or a packet transmitted to the terminal; and determine whether a string representing the first message is included based on the string pattern check, and wherein the second message is received from the terminal based on difference in quality of the channel between the base station and the another base station.

13. The apparatus of claim 11, wherein the at least one transceiver is further configured to receive the first message for requesting the setup of the voice call.

14. The apparatus of claim 11, wherein the at least one processor is further configured to: start the timer in response to the detecting of the first message; and delay triggering of the handover until the timer expires.

15. The apparatus of claim 11, wherein the at least one transceiver is further configured to receive the third message for requesting another handover indicating channel quality deterioration between the base station and the terminal during the predetermined duration, and wherein the at least one processor is further configured to trigger the another handover.

16. The apparatus of claim 11, wherein the voice call comprises a voice over internal protocol (VoIP) call.

17. The apparatus of claim 11, wherein, during the predetermined duration, the transceiver is further configured to: transmit, to the terminal, a message for a connection reconfiguration associated with setting a voice bearer, and receive, from the terminal, a message indicating a completion of the connection reconfiguration.

18. An apparatus for a terminal served by a base station in a wireless communication system, the apparatus comprising: at least one transceiver configured to: transmit a first message for requesting a setup of a voice call, wherein the first message is used to set a timer of a predetermined duration for setup of the voice call by the base station, and transmit, to the base station, a second message for requesting a handover of the terminal from the base station to another base station during the predetermined duration, wherein during the predetermined duration the handover is delayed until the setup of the voice call is completed within the predetermined duration; and at least one processor configured to: perform the handover after the predetermined duration based on a quality of a channel between the base station and the terminal, if the quality of the channel between the terminal and the base station is less than a first threshold, and a quality of the channel between the terminal and the another base station is greater than a second threshold, transmit, to the base station, a third message for requesting the handover during the predetermined duration, and perform the handover within the predetermined duration.

19. The apparatus of claim 18, wherein the voice call comprises a voice over internal protocol (VoIP) call, and wherein the second message is transmitted to the base station based on difference in quality of the channel between the base station and the another base station.

20. The apparatus of claim 18, wherein, during the predetermined duration, the transceiver is further configured to: receive, from the base station, a message for a connection reconfiguration associated with setting a voice bearer; and transmit, to the base station, a message indicating a completion of the connection reconfiguration.

* * * * *